United States Patent
Claeys

(10) Patent No.: US 7,922,591 B2
(45) Date of Patent: Apr. 12, 2011

(54) SHUTTER CLUTCH

(75) Inventor: Michael L. Claeys, Broomfield, CO (US)

(73) Assignee: Air Motion Systems, Inc., River Falls, WI (US)

( * ) Notice: Subject to any disclaimer, the term of this patent is extended or adjusted under 35 U.S.C. 154(b) by 441 days.

(21) Appl. No.: 12/177,654

(22) Filed: Jul. 22, 2008

(65) Prior Publication Data

US 2010/0018825 A1    Jan. 28, 2010

(51) Int. Cl.
*F16D 7/06* (2006.01)
(52) U.S. Cl. .................. 464/36; 29/428; 250/504 R
(58) Field of Classification Search .......... 464/35, 464/36, 10, 30; 192/54.1, 55.1, 56.1, 56.6, 192/56.61, 56.62, 56.54, 56.57; 347/102; 362/284, 321, 324; 250/504 R; 29/428
See application file for complete search history.

(56) References Cited

U.S. PATENT DOCUMENTS

| | | | | |
|---|---|---|---|---|
| 3,819,929 A | * | 6/1974 | Newman | 362/218 |
| 4,386,689 A | * | 6/1983 | Kato | 464/36 |
| 5,502,310 A | * | 3/1996 | Niestrath et al. | 250/492.1 |
| 6,132,435 A | * | 10/2000 | Young | 606/104 |
| 6,206,784 B1 | * | 3/2001 | Kato | 464/36 |
| 7,198,392 B2 | * | 4/2007 | Hobbs et al. | 362/460 |
| 7,228,752 B2 | * | 6/2007 | Tang et al. | 74/411 |
| 2004/0070975 A1 | * | 4/2004 | Register et al. | 362/284 |

FOREIGN PATENT DOCUMENTS

GB      2165899 A  * 10/1985  ............ 464/36 X

* cited by examiner

*Primary Examiner* — Greg Binda
*Assistant Examiner* — Joshua A. Skroupa
(74) *Attorney, Agent, or Firm* — Wm. Larry Alexander

(57) ABSTRACT

A clutch assembly for a UV module shutter, comprises a shutter shaft, a shutter drive arm, a clutch plate, at least one ball, a clutch thrust washer, and a spring assembly. The shutter shaft has a flange, the flange having a plurality of radially positioned flange detents. The shutter drive arm includes a drive pin, a drive arm cavity, and a receiver slot opening into the drive arm cavity, the drive pin disposable in a drive slot of a shutter end cap. The clutch plate may be disposed in the clutch plate cavity, may have a tab disposed in the receiver slot and a plurality of clutch plate detents. Each of the ball(s) may extend from one of the flange detents and may be partially disposable in one of the clutch plate detents. The spring assembly may exert a bias against the clutch plate and the thrust washer. The shutter shaft may extend through the shutter drive arm, the clutch plate, and the clutch thrust washer.

18 Claims, 12 Drawing Sheets

SHUTTER CLUTCH

BACKGROUND OF THE INVENTION

1. Field of the Invention

This invention relates to printing presses and, in particular, this invention relates to clutch systems for UV modules used in printing presses.

2. Background of the Invention

Ultraviolet-sensitive ink is used widely in the printing industry. One reason for its use is that ultraviolet-sensitive ink can be quickly cured by being irradiated with ultraviolet light. Such irradiation is accomplished by directing a light beam, containing high proportions of ultraviolet light, at the printed substrate.

Lamps used to generate light for this purpose also generate considerable amounts of other energy in the form of heat. This heat is usually of little consequence when a printing press is operating, because the light and heat are directed toward the substrate which is in motion during the printing process. However, if the heat and light generated by the lamp is directed at a nonmoving substrate for a sufficient amount of time, the substrate is damaged, often to the point of the ignition. Additionally, other nonmoving components of the printing press may be damaged by the high amount of heat generated from the lamps. When the printing press operation must be halted, for example to clear obstructions or replenish ink supplies, the light generated by the lamp must be prevented from impinging the substrate. One way to prevent irradiating nonmoving substrate is to power down the lamp. However, considerable time is necessary for the lamp to generate sufficient irradiation to cure the ultraviolet-sensitive ink when power is restored. Consequently, preventing irradiation from impinging nonmoving substrate when a printing press is halted has been accomplished by housing the lamp in a structure having shutters, which can be opened to allow irradiation or closed to prevent irradiation from leaving the structure.

As stated above, intense heat is generated by the UV lamp during operation. These high-energy lamps require high-voltage and fairly high current, some requiring 3000 volts and 17 amps and may generate temperatures of 1000 degrees Fahrenheit during operation. Consequently, the structures housing these high-energy lamps are subjected to periods of the extremely high temperatures. These high temperatures inescapably cause the metal components of these structures to expand and warp. One consequence of this expansion and warpage is failure of these structures to properly operate.

UV module shutter assemblies of the prior art were usually a "rigid" rotary mount design, which did not allow for expansion or warpage of the pair of aluminum shutter extrusions. Since these shutters expand, band, and warp various magnitudes, the prior art rigid mounting arrangement caused the shutter drive train gear assembly to be forced out of alignment. This misalignment resulted in premature gear wear, coolant leakage, and shutter drive train binding. A bound shutter drive often left the shutters substantially locked into a position other than that desired. Moreover, any amount of coolant leakage, no matter how small, led to a myriad of problems such as electrical shorting and fires. Development of a shutter end cap with the specific seal and bearing arrangement working in conjunction with the instant clutch and rounded drive pin significantly reduced these leakages, wear, and binding problems.

Additionally, drive trains for UV module shutters of the prior art often require extensive adjustment during manufacture and maintenance so that breakpoint torques will be at desired levels. This extensive adjustment is time consuming and often results in improperly adjusted clutches due to the complexity of design.

Accordingly, there is then a need for a shutter clutch which will not bind and which does not require extensive adjustment during manufacture and maintenance.

SUMMARY OF THE INVENTION

One feature of one embodiment of the clutch of this invention is that it is ambidextrous, i.e., fitting either shutter. Another feature of an embodiment of the instant clutch is that it will function at a predetermined breakpoint torque whether driven internally by the shutter shaft or manually. The clutch of this invention is further bidirectional in function, exhibiting the same breakpoint torque value regardless of whether torque is applied clockwise or counterclockwise. In use, a combination of the orientation of the UV module, gravity and location of the center of mass of the shutter extrusion may allow the clutch to be slightly easier to override when the shutters are forced toward a closed position. The use of the indexing design of the clutch of this invention and the shutter hard stops which may be built into the UV module assembly enable the instant clutch to automatically reengage to the desired open or closed shutter position when the overload torque condition has been rectified and the shutter drive gear motor energized. This semi-automatic re-engagement feature is advantageous when operating and maintaining a UV module, especially so for quickly and easily installing and/or removing UV lamps and exposing shutter reflectors for cleaning and other maintenance. Regardless of the breakpoint torque value of the clutch of this invention, its external dimensions remain the same.

The clutch of this invention can be easily adjusted to a desired breakpoint value suitable for any size UV module. Consequently a UV module may include a clutch of this invention with a breakpoint torque, which is specific to the length, hence weight, of the shutters for a module of that size. Consequently, clutch operation will be more reliable and consistent, regardless of the skill and knowledge of the persons assembling and/or servicing the module. Unlike the clutch of the prior art, there is no requirement for adjusting of spring tension, or the like, in order to achieve a clutch with a desired breakpoint torque. Rather a predetermined combination of wave springs, thrust washers, and quantity of detent balls is provided for each size module. In any specific clutch configuration a nominal breakpoint torque required to disengage the clutch is linearly proportional to the number of detent balls used. The shutter shaft flange, accordingly, may be manufactured to include a specific number of detent holes arranged in a radial array. The number of detent balls used may vary from a quantity of one to virtually any number necessary to achieve the desired breakpoint torque. Additionally, small increases in dimensions such as diameters of detent holes of the clutch plate can produce nonlinear, e.g. exponential, increases in breakpoint torque.

One advantage of the clutch of this invention is that specific breakpoint torque values may be realized by utilizing component combinations specific for each size of UV module.

Without changing any aspect of the physical size of the clutch of this invention, several breakpoint torque values may be obtained by altering the clutch components and the orientation of the clutch components.

For a specific clutch assembly, breakpoint torque values are dependable and repeatable. Special skills are not required to assemble or service the clutch and adjustment or experimentation is not required to obtain the desired breakpoint value. Breakpoint torque cannot be casually or accidentally altered externally. The clutch must first be disassembled in order to alter the breakpoint setting.

The clutch of this invention will function at the same predetermined breakpoint torque whether driven internally by the shutter shaft or manipulated externally by hand.

The breakpoint torque value may be adjusted during assembly by virtue of a specified combination of wave springs, thrust washers, and detent balls. An integral shutter drive pin may be incorporated into the shutter drive arm. Therefore, fewer threaded parts are required to be fabricated and installed. Additionally, fewer parts are present to be dropped or fall into an operating printing press during installation or servicing, potentially damaging the printing press or halting operation until retrieved.

The integral drive pin of this invention further provides a mounting location for a sensor magnet.

Although left-hand specific and right-hand specific shutter end caps are required, the components of the clutch of this invention are ambidextrous and will fit either shutter assembly.

The clutch subassembly of this invention is bidirectional and will exhibit the same breakpoint torque value regardless of whether torque is applied clockwise or counterclockwise in direction.

The clutch of this invention features a narrow profile, approximately 5/16 inch thick in one embodiment, including the retaining ring holding the clutch in place on the shutter shaft.

The clutch plate of this invention transfers torque from the shutter shaft to the shutter drive arm by means of a single drive tab, detent holes, and an array of detent balls.

By using the indexing clutch design of this invention and a special shutter hard stops built into the UV module assembly, the clutch of this invention may automatically reengage itself in the desired opened or closed shutter position once the overload torque condition has been rectified and the motor is energized.

During normal UV module shutter operation with the instant clutch engaged, there is no relative motion among the clutch components. These clutch components are therefore free of wear while the clutch is engaged.

During normal disengagement, only one main internal component, the clutch plate, moves relative to the other clutch components. During normal disengagement, the clutch plate rotates around the shutter shaft and moves axially a very small amount as its detent holes pass over the detent balls. Axial displacement of the clutch plate is on the order of 0.025+/−0.015 inch in one embodiment.

The single drive tab on the clutch plate always remains engaged inside the drive tab receiver slot within the shutter drive arm.

Realigning orientation of the shutter drive arm, relative to the shutter shaft, depends only on the number of detent balls in the clutch plate. Realignment orientation, accordingly, is not dependent on the number of detent balls employed, nor is it dependent on the number of detent holes arrayed around the shutter drive flange.

Whether or not the instant clutch is in an engaged or disengaged mode, the clutch is designed with features providing a highly desirable multi-axial freedom of motion enabling reliable functionality of the UV shutter module assemblies and the shutter drive train assembly. In a nominal over torque condition, there is very little or no linear displacement of the shutter drive arm, sensor magnet, or shutter end caps, relative to any part of the UV module. If a long term continuous torque overload situation occurs, there is minimal relative motion between clutch components. Accordingly the clutch components wear very little when the clutch is disengaged. The foregoing arrangement assures reliable clutch performance, reliable shutter action, reliable shutter position sensing, and produces no detrimental effect on the shutter shaft-to-shutter end cap seal arrangement. Thus, the clutch design of this invention contributes to minimizing shutter drive train binding, minimizing coolant leakage, and maximizing UV module reliability.

Regardless of the breakpoint torque value selected for a clutch of this invention, the external dimensions of the clutch remain unchanged.

The clutch of this invention is easily field serviceable, due to its simple design, small number of parts, and ease of assembly and disassembly.

It is understood that the above-described figures are only illustrative of the present invention and are not contemplated to limit the scope thereof.

DETAILED DESCRIPTION

Figure 1:
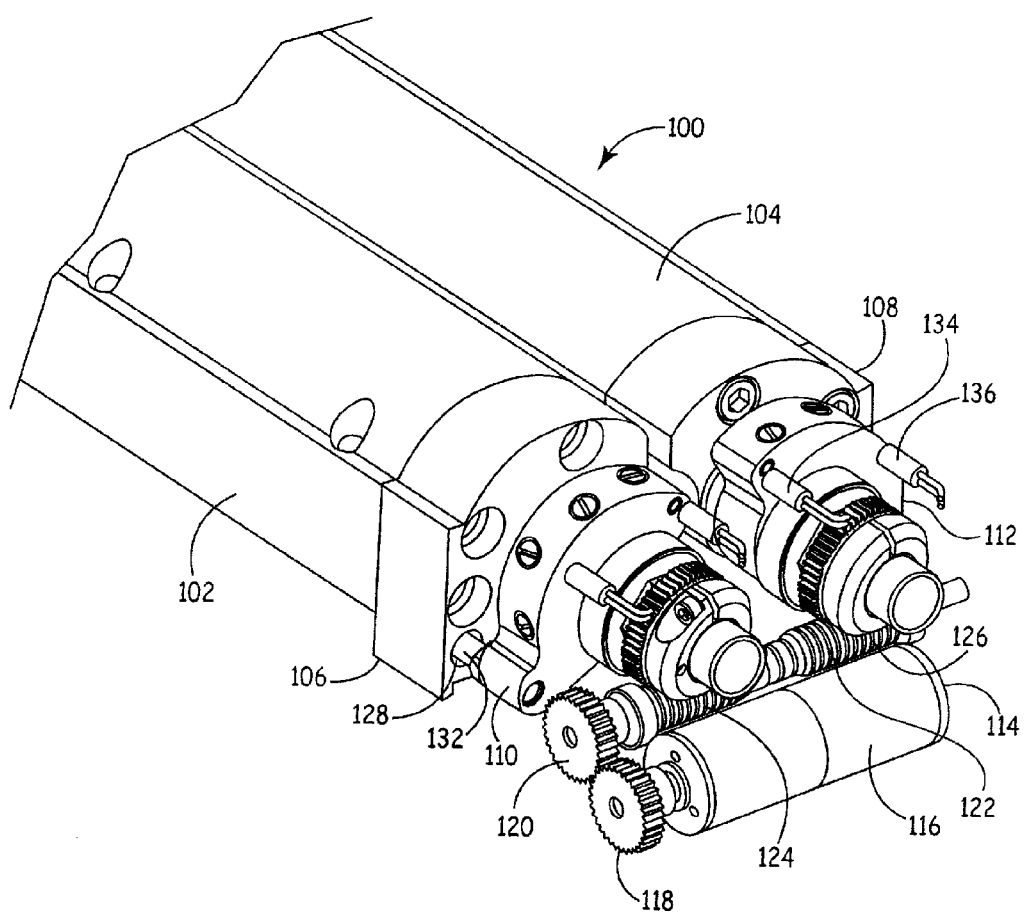
FIG. 1 is perspective view of a pair of shutter assemblies, shutter clutches and drive train of the prior art.

Each of the features and methods disclosed herein may be utilized separately or in conjunction with other features and methods to provide improved embodiments of this invention and methods for making the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, combinations of features and methods disclosed in the following detailed description may not be necessary to practice the invention in the broadest sense, and are instead taught merely to particularly describe representative and preferred embodiments of the invention The clutch of this invention is advantageously present in a UV module 100, as shown in FIG. 1. A more detailed description of a suitable embodiment of the UV module 100 is provided in co-pending U.S. patent application Ser. No.

12/001,080, filed Dec. 7, 2007, entitled, UV Module, and hereby incorporated by reference. The UV module 100 includes respective left and right shutter assemblies 102, 104. The left and right shutter assemblies 102, 104 include respective left and right shutter end caps 106, 108 and are, in turn, opened and closed by respective left and right clutch/pin drive assemblies 110, 112. The clutch/pin drive assemblies 110, 112 are powered by a worm drive assembly 114, which includes a drive gear motor 116, which rotates a spur gear 118. The spur gear 118, in turn, meshes with, and rotates, a spur gear 120, the spur gear 120 attached to an end of a worm shaft 122. The worm shaft 122 includes opposed thread segments 124, 126. As more fully explained in U.S. patent application Ser. No. 12/001,080, the thread segments 124, 126 oppositely rotate the left and right clutch/pin drive assemblies 110, 112 when the shutter assemblies 102, 104 are being opened or closed. Each of the end caps 106, 108 defines a slot 128, 130 (slot 130 not shown) within which a drive pin 132 of the clutch/pin drive assembly is present during operation. Shutter position sensors 134, 136 detect whether the shutter assemblies 102, 104 are in an open or closed position, respectively.

Figure 2:
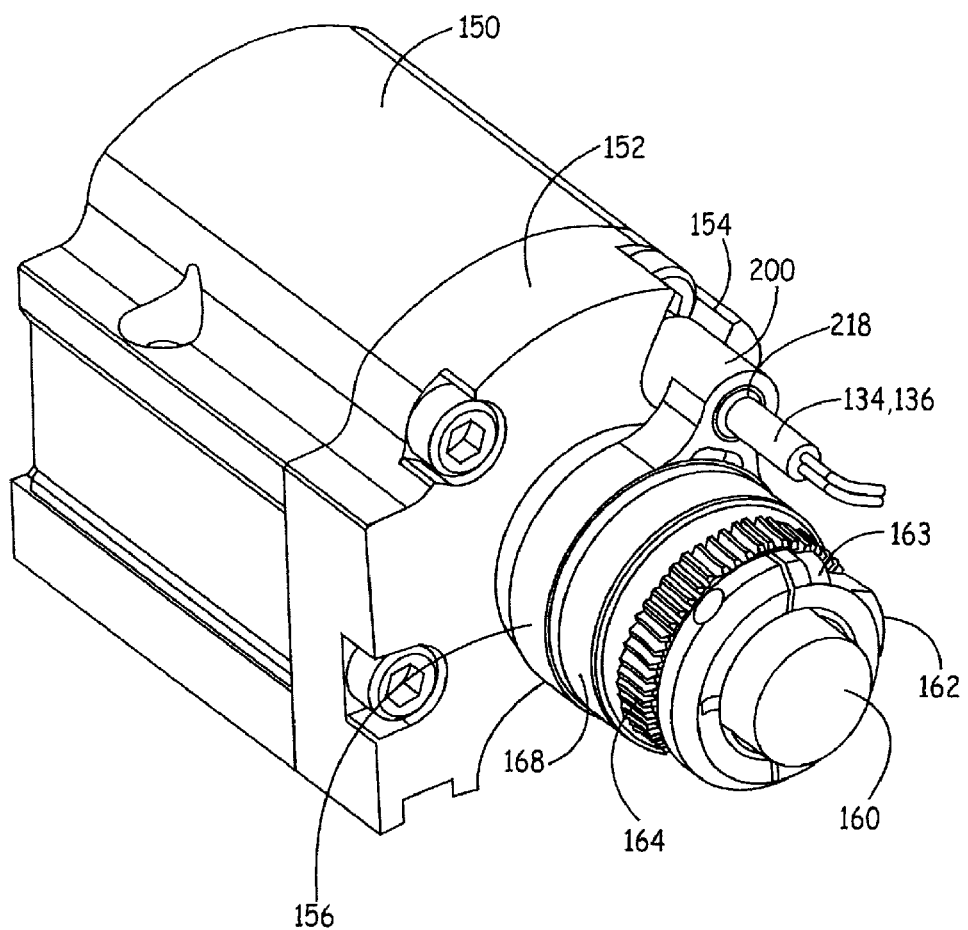
FIG. 2 is a perspective view of a left shutter assembly and shutter clutch of this invention.

Referring to FIG. 2, a left shutter assembly 150 has a left shutter end cap 152 with a slot 154 in place of the drive slot 128 depicted in FIG. 1. In contrast to the drive slot 128, drive slot 154 opens into, and can be accessed from, the periphery of the shutter end cap 152. Also depicted in FIG. 2, is a left shutter drive assembly 156 replacing the left clutch/pin drive assembly 110. Because the left shutter assembly 150, left shutter end cap 152, and left shutter drive assembly 156 are substantially mirror images of right counterparts, only the left embodiments of these components are discussed and described.

Figure 3:
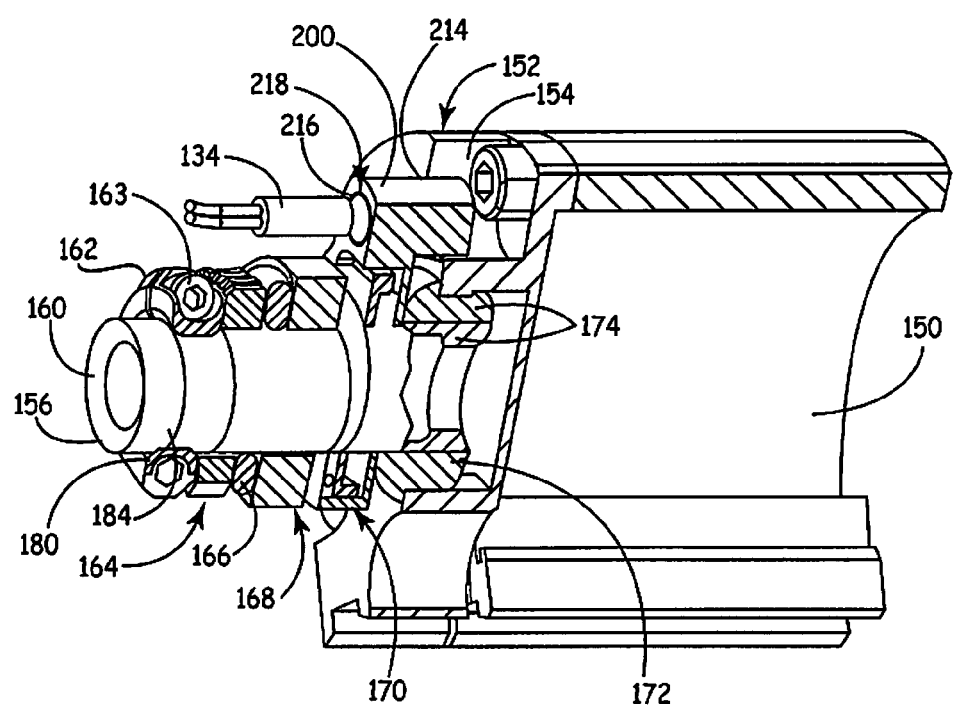
FIG. 3 is a cross sectional view of the shutter clutch of FIG. 2.
Figure 4:
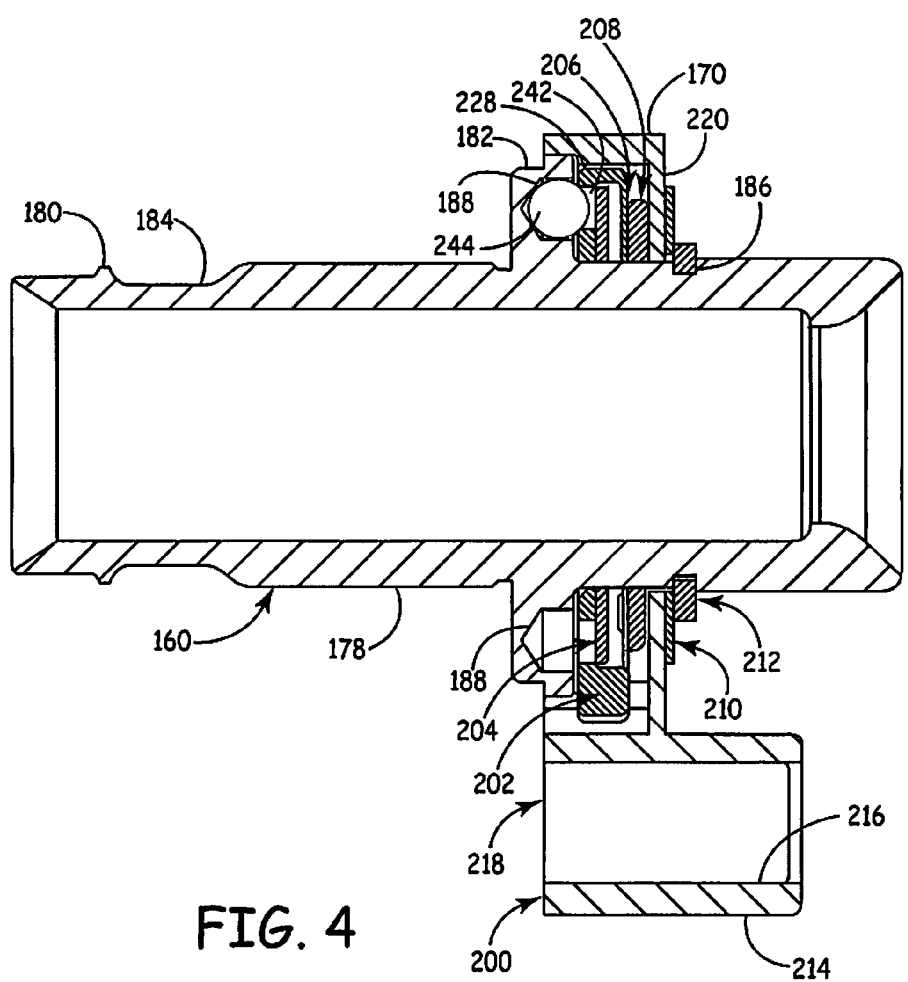
FIG. 4 is another cross sectional view of the shutter clutch of FIG. 2.
Figure 5:
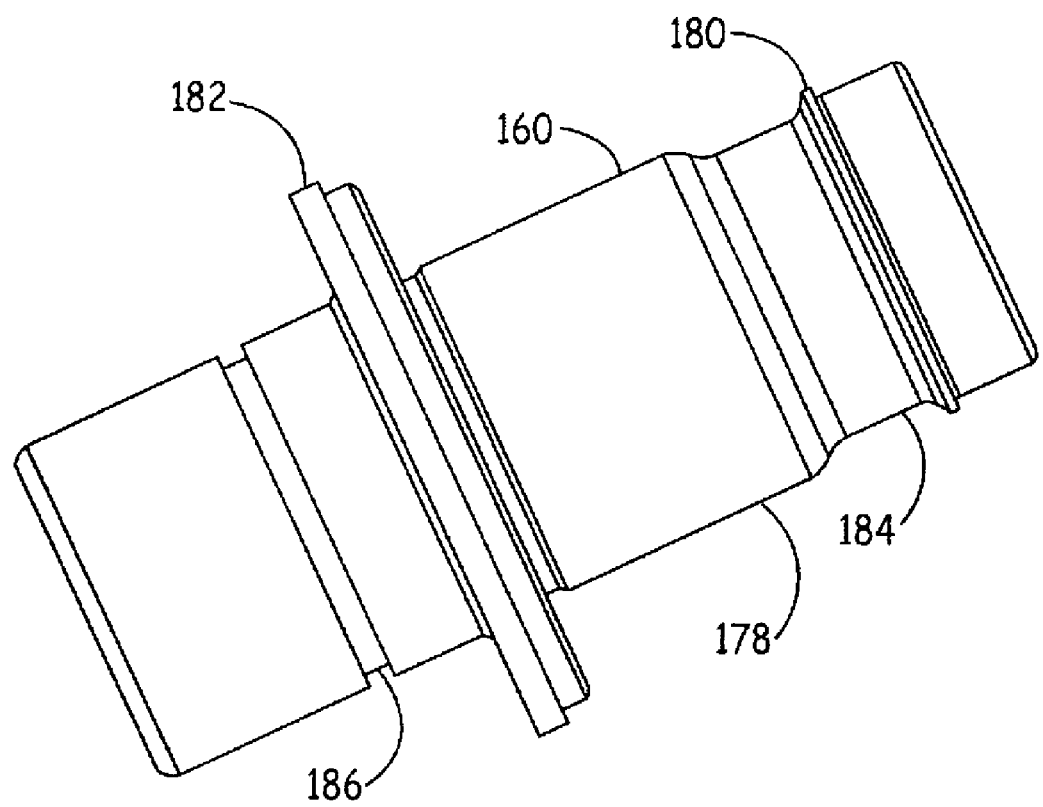
FIG. 5 is a side view of a shutter shaft used with the clutch of this invention.
Figure 6:
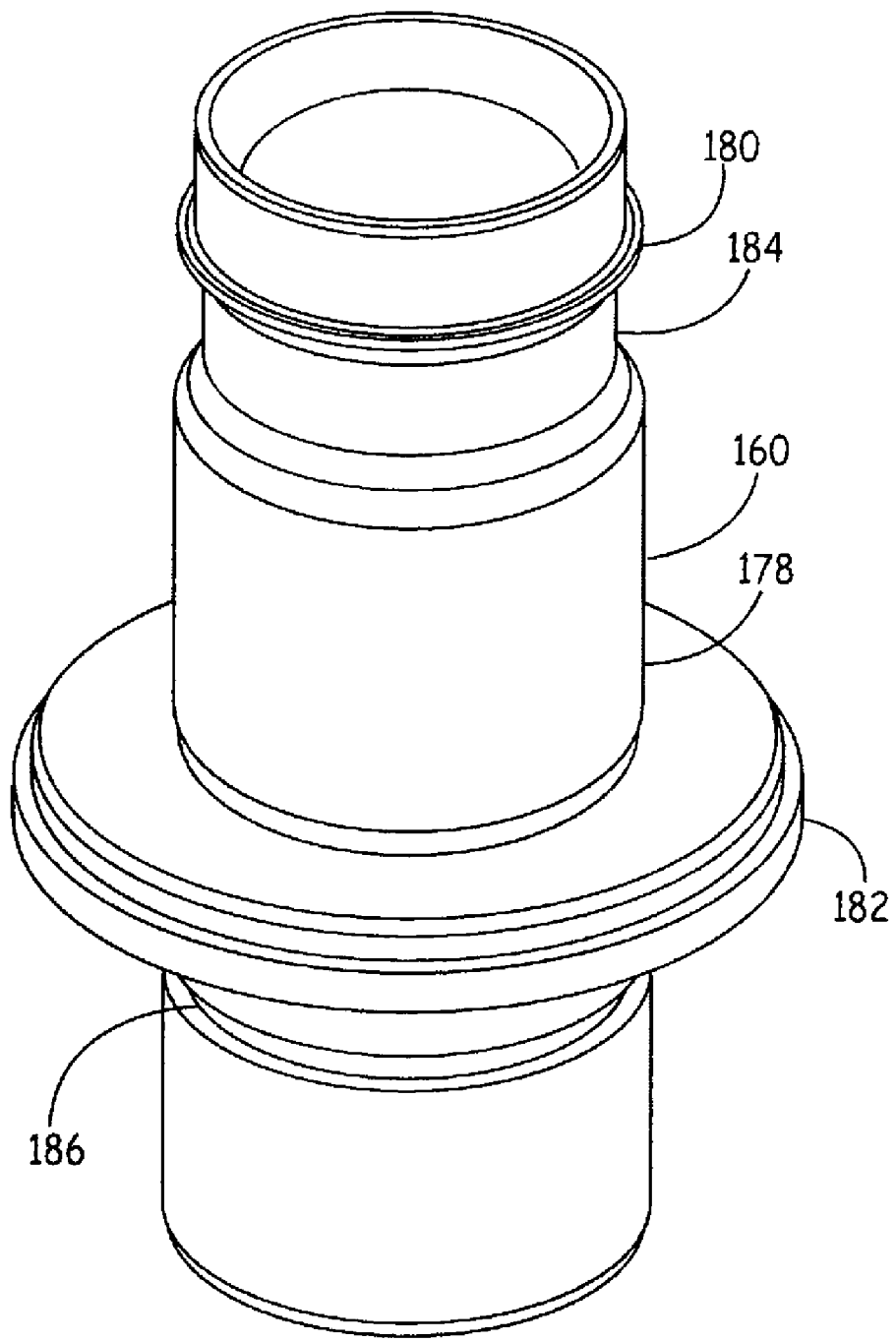
FIG. 6 is a perspective view of the shutter shaft of FIG. 5.
Figure 7:
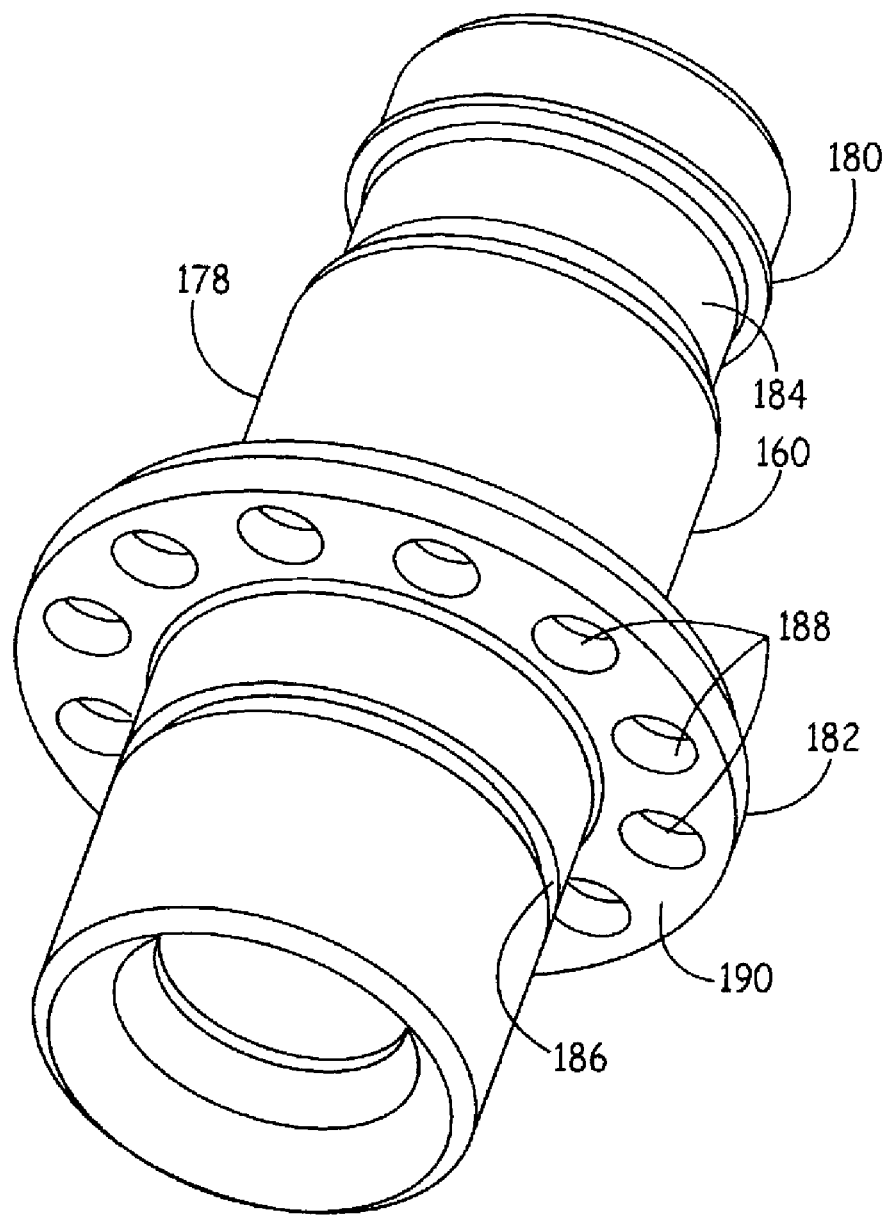
FIG. 7 is another perspective view of the shutter shaft of FIG. 5.

Referring now to FIGS. 3 and 4, the shutter drive assembly 156 has a shutter shaft 160, a collar 162, a drive gear 164, a bearing spacer 166, a bearing 168, a shutter drive clutch assembly 170, a bearing 172, and seals such as 0-rings 174. The collar 162 and drive gear 164, in one embodiment, may be substantially similar to the collar 334 and gears 324, 326 disclosed in U.S. patent application Ser. No. 12/001,080, which are secured to the shutter shafts 160 as more fully explained below.

FIGS. 4, 5, 6, and 7 depict the shutter shaft 160, which has a cylindrical body 178, flanges 180, 182, and grooves 184, 186. A plurality of detent holes 188 extend inwardly from a face 190 of the flange 182. The two piece collar 162 attaches to the shutter shaft 160 using the drive pin 163. Individual pieces of the clamp collar 162 clamp securely to the shutter shaft 160 and the drive pin 163 protrudes from the collar 162 to engage a slot (not shown) in each of the worm gears 164. When thusly secured, an angled shoulder (not shown) of the collar 162 abuts the flange (or shoulder) 180 of the shutter shaft 160. As fasteners 163 secure the two-piece collar 162 to the shutter shaft 160, one of the worm gears 164 is wedged toward the bearing-spacer (not shown). Each of the worm gears 164 is then tightly clamped in place between the clamp collar 162 and the spacer and is positioned to fully mesh with the left and right hand segments 124, 126 of the worm shaft 122.

Figure 8:
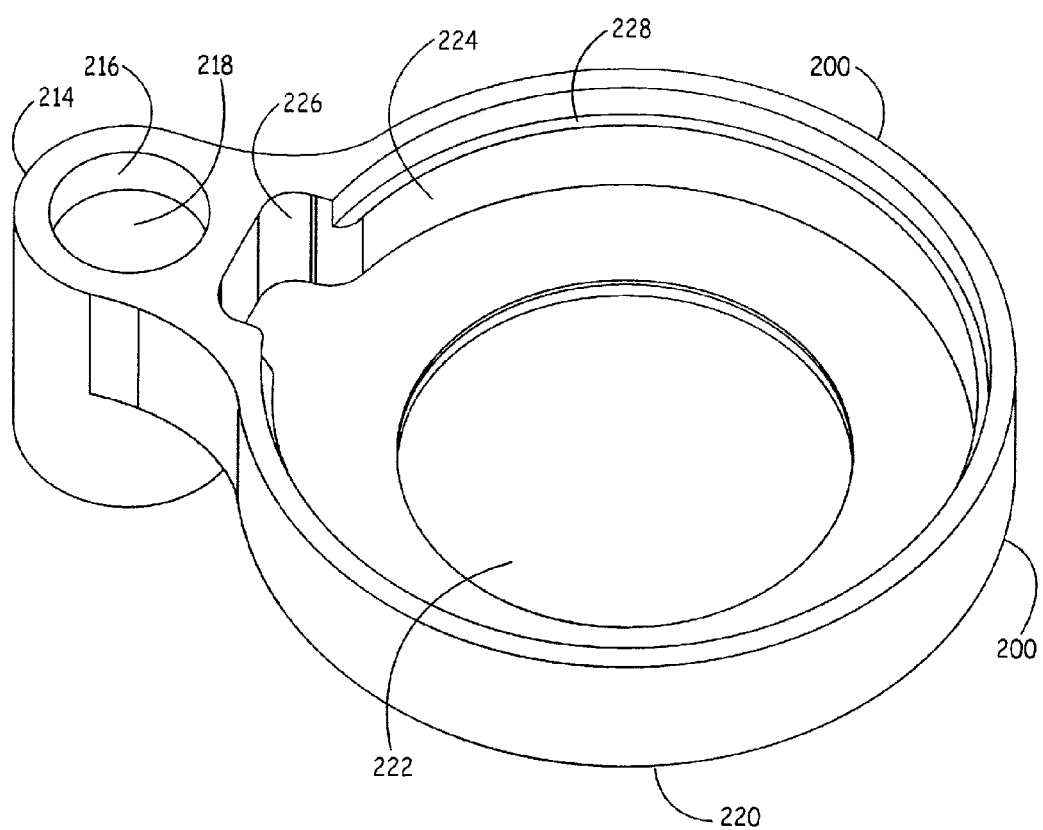
FIG. 8 is a perspective view of a shutter drive arm of this invention.

Referring back to FIGS. 3 and 4, the shutter drive clutch assembly 170 has a shutter drive arm 200, a clutch plate 202, a clutch thrust washer 204, a spring assembly such as at least one or a plurality of, e.g., two, wave (disk) springs 206, respective inner and outer thrust washers 208, 210, and a retaining ring 212. As seen in FIGS. 3, 4, and 8, the shutter drive arm 200 includes an extension such as a pin 214 having a bore 216, which accommodates a sensor magnet 218. As depicted in FIG. 8, the shutter drive arm 200 also has a shutter drive arm body 220 which defines an aperture 222 and has a cavity 224. The cavity 224 opens into a slot 226 proximate the extension 214 and includes an intermediate, stepped ledge 228. The purpose of the stepped ledge 228 is to minimize the amount of undesirable "twisting" motion of the instant clutch assembly which could occur when a shutter was being opened or closed.

Figure 9:
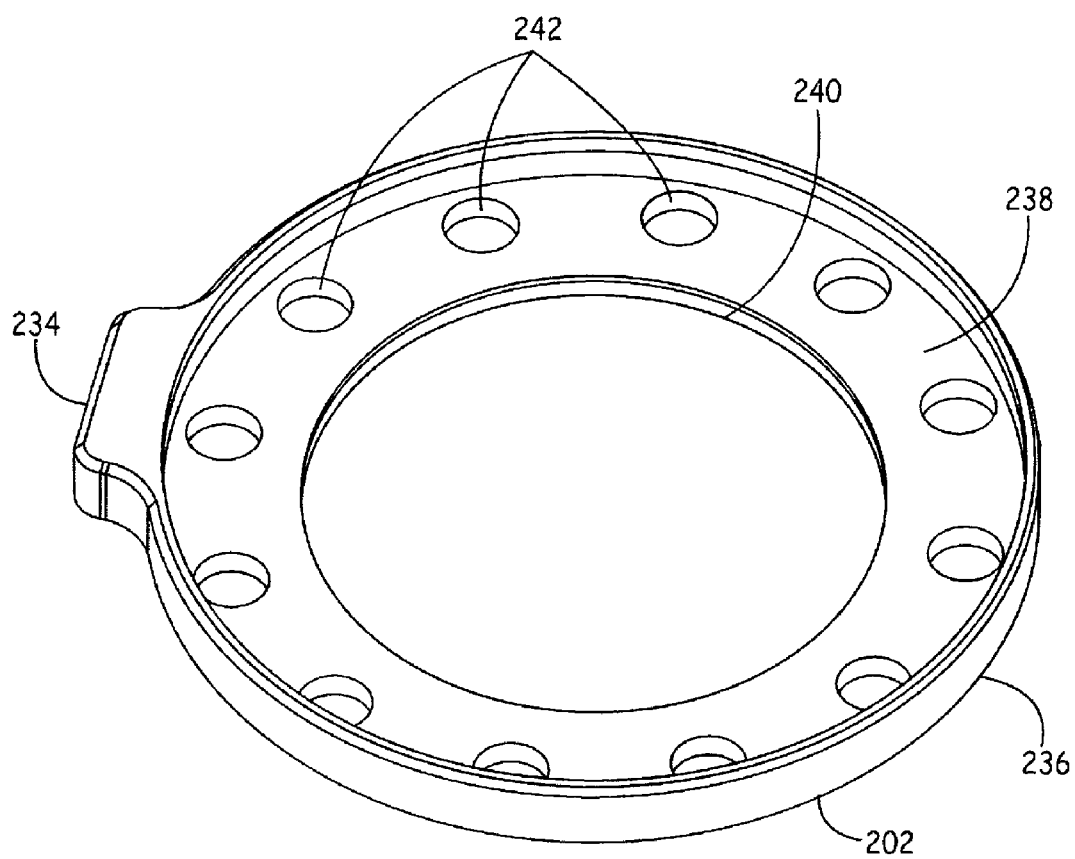
FIG. 9 is a perspective view of a clutch plate of this invention.

Referring now to FIG. 9, the clutch plate 202 has an extension such as a tab 234 depending from a body 236. The body 236 is generally circular in cross section, defines a cavity 238, an aperture 240, and a plurality of detent holes 242. The tab 234 is dimensioned to be accommodated in the shutter drive arm slot 226 when the clutch plate 202 is accommodated within the shutter drive arm cavity 224.

Figure 10:
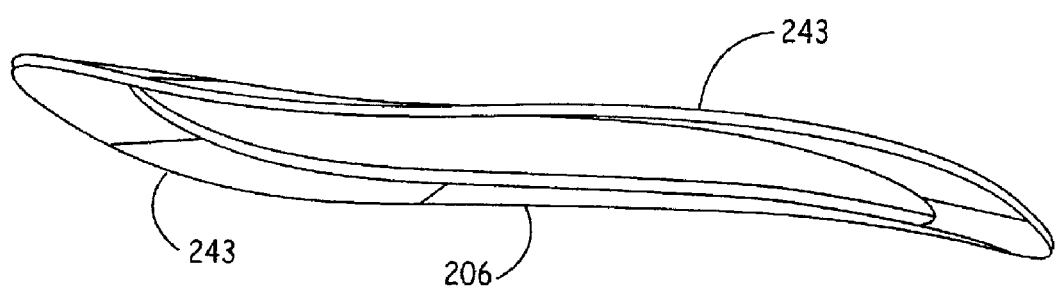
FIG. 10 is a perspective view of a wave spring used in the clutch of this invention.

An exemplary wave spring 206 with crests 243 is depicted in FIG. 10.

Figure 11:
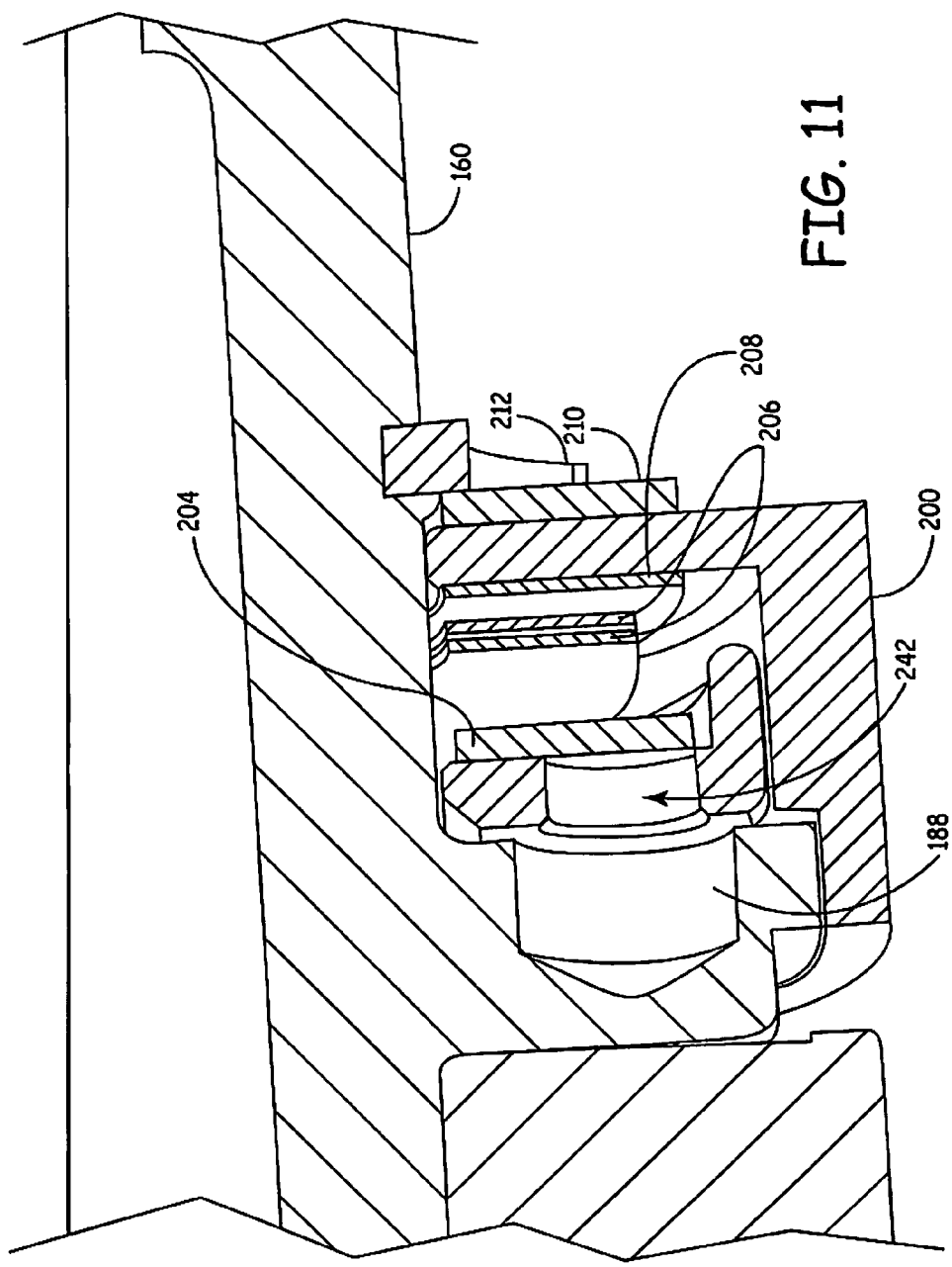
FIG. 11 is a cross section showing assembly components of the clutch of this invention.

When assembled as shown in FIGS. 4 and 11, the flange 182 is disposed against the ledge 228 and a plurality of balls 244 are disposed within each of the flange detent holes 188 and within the clutch plate detent holes 242, as the clutch plate 202 is disposed within the shutter drive arm body 220. The clutch thrust washer 204 is disposed so as to contact the clutch plate body 236 within the clutch plate cavity 238. The wave springs 206 are then held in contact with the clutch thrust washer 204 by the inner thrust washer 208. The foregoing assembly of components is then maintained against the shutter drive arm body 220 by the outer thrust washer 210, which is, in turn, secured by the retaining ring 212 positioned in slot 186.

The instant clutch 170, in one embodiment, is primarily built around the shutter shaft 160 and the shutter shaft integral flange 182. Coolant flows into, or out of, the UV module shutters through shutter shaft 160. The integral flange 182 maintains in place the detent balls 244. The shutter drive arm 200, clutch plate 202, and shutter end cap 152 rotate about the shutter shaft 160. The shutter shaft 160 thus acts as a precision bearing surface and provides concentric positioning for each of the foregoing components. Though not considered an actual clutch component, the shutter shaft bearing 168 supports the shutter shaft 160 and maintains the axial position of the shutter shaft 160 and clutch assembly 170, relative to the UV module.

The shutter drive arm 200 may rotate about the shutter shaft 160 and is held in place on the shutter shaft 160 with a retaining ring 212. The shutter drive arm 200 also features an integral drive pin 214 and a single drive tab receiver slot 226. Installed in the drive pin is a sensor magnet 218. The shutter drive arm 200 houses the majority of the functional components of the clutch and its geometry assists in maintaining correct alignment of these components.

One purpose of the clutch plate 202 is to transfer torque from the shutter shaft 160 to the shutter drive arm 200. The clutch plate 202 accomplishes this by means of its single drive tab 234, detent holes 242, and detent balls 244. The detent balls 244 are always present in respective detent holes 188 in the shutter shaft flange 182. The detent balls 244 may, however, exhibit a small degree of spin while the instant clutch is disengaged and is attempting to re-engage. The detent balls 244 perform two tasks. While the instant clutch is in an engaged mode, the detent balls 244 act as a set of keys to positively mate the shutter flange 182 to the clutch plate 202. The detent balls also provide a ramp for the detent holes 242. This ramp feature provides the necessary resistance against clutch disengagement. Additionally, the ramp feature serves to "encourage" re-engagement of the instant clutch. The number of detent balls 244 used may vary according to the "breakpoint" desired for the particular clutch embodiment.

Two different sets of detent holes are used in the instant clutch. The first set 188 is present in a radial array with a specific radius "r" on the inside face 10 of the shutter flange 182. These detent holes 188 are slightly larger in diameter than the detent balls 244 and are machined to a controlled depth, thus assuring that a pre-determined portion of the detent ball 244 protrudes beyond the face of the shutter flange 182. These detent holes 188 receive and retain the detent balls 244 in their respective positions by means of dimensions such as their diameter and depth and by forces generated by the thrust washer 208, wave spring(s) 206, and clutch plate 202 biased against the detent balls 244. The second set of detent holes 242 is present in the clutch plate 202. These detent holes 242 are also machined in a radial array with the same specific radius "r," but may have a diameter smaller than that of the detent balls 244. This arrangement produces a specific and repeatable amount of partial engagement of a specific detent ball 244 to a detent hole 242. The performance of the instant clutch may be dependent upon this particular engagement of balls 244 to detent holes 242. In some embodiments, slots arranged in a radial array may be substituted for the round detent holes in the instant clutch plate.

Wave springs 206 force the clutch plate 202 against the detent balls 244 to thereby maintain clutch engagement or to effect clutch re-engagement. The wave springs 206 may be selected for a desired spring constant. The performance of the instant clutch may be highly dependent upon the force generated by the wave springs 206.

Thrust washer 204 acts as a bearing surface to transfer and distribute axial forces generated by the wave springs 206. Thrust washer 204 thus tends to more evenly distribute the concentrated "point" forces developed at the crests 243 of the wave spring(s) 206. Thrust washers 204, 208, 210 may thus offer a degree of pre-load force adjustment for the wave spring(s) 206, which may ultimately affect the breakpoint torque value for the clutch of this invention. Breakpoint adjustment may be accomplished, in part, by specifying certain thrust washer thicknesses, either individually or by creating specific thickness combinations using several thrust washers.

Though not considered an actual clutch component, the shutter end cap 152 is driven directly by the shutter drive pin 214. By virtue of the securement of the shutter end cap 152 to the shutter flange 182, driving the shutter end cap 152 opens or closes the instant shutter assembly.

A sensor magnet 218 may be present in the shutter drive pin 214. Sensors 134, 136 mounted within the instant UV module monitor the "open" or "closed" position of the instant shutter assembly by sensing proximity of the sensor magnet 218.

During normal UV module operation, shutter drive forces originating in the shutter drive gear motor 116 are transferred to the shutter shaft 160 by a gear combination shown in FIG. 1. These forces, in turn, are transmitted via the detent balls 244 and detent holes 242 in the clutch plate 202. The drive tab 234, integral to the clutch plate 202 in one embodiment, is engaged in a slot 226 in the shutter drive arm 200, effectively transferring drive torque from the clutch plate 202 to the shutter drive arm 200. The shutter drive arm 202 also includes an integral drive pin 214, which is engaged in a slot 154 in the shutter end cap 152.

The detent holes 242 in the clutch plate 202 are smaller in diameter than the detent balls 244. The smaller detent holes 242 allow the detent balls 244 to enter only partially into the detent holes 242, thereby resulting in a carefully controlled amount of ball-to-hole engagement. This foregoing arrangement creates a specific "climb-out" angle of a detent ball 244 relative to the rim of the detent hole 242. This "climb-out" angle directly affects the breakpoint torque of the clutch. The drive tab 234 on the clutch plate 202 is in continual engagement with the receiver slot 226 within the shutter drive arm 200 and the integral drive pin 214 on the shutter drive arm 200 is in continual engagement with a slot 154 in the shutter end cap 152.

By means of the foregoing components, the drive forces originating at the shutter drive gear motor 116 are subsequently transmitted to open or close the instant shutter assembly 150 or to hold the shutter assembly 150 in either the open or closed positions. The instant clutch further provides the protection of a torque overload device. Additionally, the instant clutch functions in conjunction with the shutter end cap seal/bearing arrangement to provide sufficient freedom of motion to prevent gear train damage.

Figure 12:
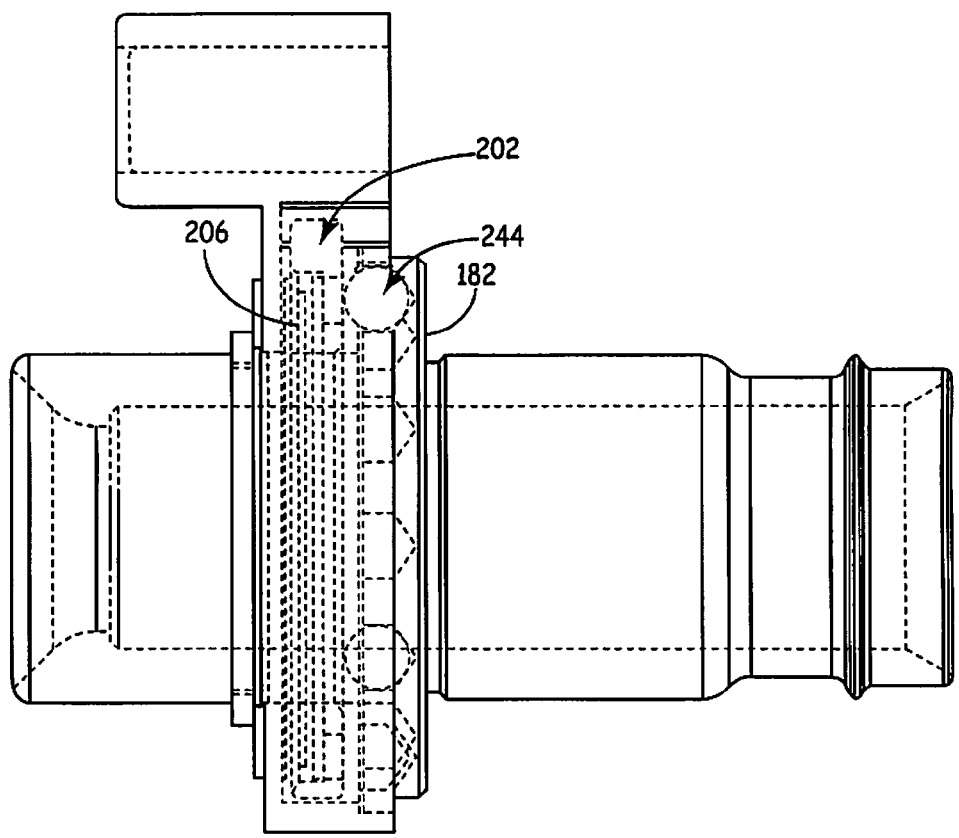
FIG. 12 is a cross section of the clutch of this invention in a disengaged position.

When the instant clutch is fully engaged as shown in FIG. 4, the clutch operates in a completely static condition. There is no relative motion between any of the clutch components, shutter shaft, or shutter end cap. The wave springs 206 constantly force the clutch plate 202 against the detent balls 244 embedded in the flange 182 of the shutter shaft 160. In this "clutch engaged" condition, all detent balls 244 remain seated in detents 242 within the clutch plate 202. A nominal over-torque condition may occur during a gear motor-powered shutter operation or by manipulating the shutter manually. In a nominal over-torque condition, the clutch plate detent holes 242 disengage from the balls 244 present in the flange 182 of the shutter shaft 160. This disengagement is a result of the rims of the detent holes 242 in the clutch plate 202 "climbing" over the stationary detent balls 244. During this period of disengagement and as shown in FIG. 12, the clutch plate 202 is minimally displaced axially away from the shutter shaft flange 182. Except for friction forces induced by the wave springs 206 against the thrust washer 204 and detent balls 244 riding along the face 236 of the clutch plate 202 between detent holes 242, drive forces are effectively reduced to a minimum amount at the shutter drive arm 200. Stated otherwise, due to this small amount of internal friction, a disengaged clutch of this invention does not lend itself to be considered to be a true "free-running" type clutch. Even when the clutch is disengaged, a small amount of driving force may be produced by friction between the detent balls 244 and the clutch plate 202.

When the shutter drive motor 116 is energized during a "disengaged" situation, the shutter shaft 160 continues to rotate relative to the shutter drive arm 200. The detent balls 244 continually attempt to reengage the clutch plate 202 each time the clutch plate detent holes 242 are aligned with the detent balls 244. Re-engagement occurs when two conditions are met: 1) the over-torque condition must be corrected; and 2) the rotary position of the clutch plate 202 must be so as to allow the detent balls 244 to realign with the detent holes 242 in the clutch plate 202. Due to this characteristic of the clutch attempting to reengage intermittently, the clutch may be classified as an "indexing" type. Other than the small displacement of the clutch plate 202 during disengagement, there is no other axial motion of any other component, except for the slight compression of the wave springs 206 and thrust washer 204, that the wave spring 206 is biased against. The detent balls 244 remain in place in detent holes 188 in the shutter flange 182. The frequency of reciprocation of the clutch plate 202 is thus not dependent on the number of detent balls 244, but rather is dependent on the rotational speed of the shutter shaft 160, relative to the shutter drive arm 200 (or vice versa) and on the number of detent holes 242 in the clutch plate 202.

Realignment orientation of the shutter drive arm 200 relative to the shutter shaft 160 is dependent only on the number of detent holes 242 in the clutch plate 202. Realignment orientation is thus not dependent on the number of detent balls 244 employed, nor is it dependent on the number of detent holes 188 arrayed about the shutter drive flange 182.

Axial displacement of the clutch plate 202 may be partially dependent on the size of the detent balls 244 in the shutter flange 182 relative to the size of the mating detent holes 242 in the clutch plate 202 and partially dependent on the depth of the detent holes 188 in the shutter shaft flange 182. In practice, the amount of axial displacement may be a small fraction of the diameter of a detent ball. The actual nominal displacement range may be on the order of 0.025+/−0.015 inch.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A clutch assembly for a UV module, comprising:
   a shutter shaft with a flange, said flange having a plurality of radially positioned flange detents;
   a shutter drive arm including a drive pin, a drive arm cavity, and a receiver slot opening into the drive arm cavity, said drive pin disposable in a drive slot of a shutter end cap;
   a clutch plate disposed in a clutch plate cavity and having a tab disposed in said receiver slot and a plurality of clutch plate detents;
   a plurality of balls, each of said balls extending from one of said flange detents and partially disposable in one of said clutch plate detents;
   a clutch thrust washer;
   a spring assembly exerting a bias against said clutch plate and said thrust washer; and
   means for holding said washer in place on said shutter shaft,
   said shutter shaft extending through said shutter drive arm, said clutch plate, and said clutch thrust washer.

2. The clutch assembly of claim 1, wherein one of said balls is seated in each of said flange detents.

3. The clutch assembly of claim 1, wherein said holding means includes a retaining ring.

4. The clutch assembly of claim 1, further comprising inner and outer thrust washers, said spring assembly biased against said inner thrust washer, said drive arm disposed between said inner thrust washer and said outer thrust washer.

5. The clutch assembly of claim 1, wherein said spring assembly comprises a wave spring.

6. The clutch assembly of claim 1, wherein said spring assembly comprises a pair of wave springs.

7. The clutch assembly of claim 1, wherein a dimension of each of said flange detents is larger than a diameter of each of said balls.

8. The clutch assembly of claim 7, wherein said dimension is a diameter.

9. The clutch assembly of claim 7, wherein a depth of each of said flange detents is such that each of said balls is partially disposed in one of said flange detents.

10. The clutch assembly of claim 9, wherein a diameter of each of said clutch plate detents is less than a diameter of each of said balls.

11. The clutch assembly of claim 1, in combination with a UV module.

12. A method of assembling a clutch assembly for a UV module, comprising:
    disposing a plurality of balls between a clutch plate and a shutter shaft flange, said balls extending from detents in said shutter shaft flange and partially disposable in detents present in said clutch plate, said shutter shaft flange integral with a shutter shaft;
    biasing said clutch plate: and
    securing said clutch plate within a shutter drive arm,
    wherein securing said clutch plate includes disposing a retaining ring in a shutter shaft groove.

13. The method of claim 12, further including disposing a clutch thrust washer against the clutch plate.

14. The method of claim 13, wherein biasing said clutch plate includes disposing a wave spring between said clutch thrust washer and an inner thrust washer.

15. A method of configuring a UV module clutch between an engaged position and a disengaged position, the clutch comprising a shutter shaft, a plurality of balls, a clutch plate, and a spring assembly, the shutter shaft having a shutter shaft flange, a plurality of shutter shaft detent holes present in the shutter shaft flange, the detent balls disposed in, and extending from, the shutter shaft detent holes, the clutch plate having a plurality of clutch plate detents, each clutch plate detent having a diameter smaller than a diameter of each of said balls, the spring assembly axially biasing the clutch plate and balls against the shutter shaft flange, the method comprising exerting a breakpoint torque on the shutter shaft flange or the clutch plate, thereby displacing the clutch plate from the balls and thereby configuring the clutch from the engaged position to the disengaged position,
    wherein said breakpoint torque is exerted on a shutter drive arm.

16. The method of claim 15, wherein the spring assembly includes a plurality of wave springs and wherein said plurality of wave springs biases said clutch plate and said balls such that said clutch plate is displaced when said breakpoint is exerted.

17. The method of claim 15, wherein the clutch further comprises a shutter drive arm mechanically connected to said clutch plate and wherein said breakpoint torque is exerted through said drive arm to said clutch plate.

18. The method of claim 15, wherein said shutter drive arm includes a pin housing a sensor magnet, wherein a shutter assembly attached to said clutch is in an open or closed position, and wherein said open or closed position is detected by a sensor in proximity to said sensor magnet.

* * * * *

UNITED STATES PATENT AND TRADEMARK OFFICE
CERTIFICATE OF CORRECTION

| | | |
|---|---|---|
| PATENT NO. | : 7,922,591 B2 | Page 1 of 1 |
| APPLICATION NO. | : 12/177654 | |
| DATED | : April 12, 2011 | |
| INVENTOR(S) | : Claeys | |

It is certified that error appears in the above-identified patent and that said Letters Patent is hereby corrected as shown below:

Column 10, line 52, claim 18: "a pin housing a sensor magnet" should read -- a pin housing and a sensor magnet --

Signed and Sealed this
Twenty-eighth Day of June, 2011

David J. Kappos
*Director of the United States Patent and Trademark Office*